United States Patent [19]

Pinier et al.

[11] Patent Number: 5,625,654
[45] Date of Patent: Apr. 29, 1997

[54] METHOD AND DEVICE FOR FINDING A CHARACTERISTIC DATA GROUP PERIODICALLY INSERTED INTO A DATA STREAM

[75] Inventors: François Pinier, Strasbourg; Claude Schmitt, Illkirch, both of France

[73] Assignee: Alcatel N.V., Rijswijk, Netherlands

[21] Appl. No.: 337,506

[22] Filed: Nov. 8, 1994

[30] Foreign Application Priority Data

Nov. 9, 1993 [FR] France ................................. 93 13344

[51] Int. Cl.$^6$ ........................................................ H04L 7/00
[52] U.S. Cl. .......................... 375/365; 375/368; 370/514
[58] Field of Search ................................. 375/354, 365, 375/366, 368, 363; 370/100.1, 101, 102, 105.4, 105.5

[56] References Cited

FOREIGN PATENT DOCUMENTS

| 0171789A1 | 2/1986 | European Pat. Off. . |
| 0456974A2 | 11/1991 | European Pat. Off. . |
| 3623910A1 | 1/1988 | Germany . |

OTHER PUBLICATIONS

Nomen Nescio, "Generalized Framing Algorithm for American (T1) and European (CEPT) Primary Layer 1 Frame Structures", *IBM Technical Disclosure Bulletin*, vol. 31, No. 7, Dec. 1, 1988, pp. 161–176.

P. Tolstrup Nielsen, "Distributed Frame Synchronisation by Nonlinear–Shift–Register Sequences", *Electronics Letters*, vol. 9, No. 4, Feb. 22, 1973, pp. 73–75.

*Primary Examiner*—Stephen Chin
*Assistant Examiner*—Hai H. Phan
*Attorney, Agent, or Firm*—Sughrue, Mion, Zinn, Macpeak & Seas

[57] ABSTRACT

A method and device for finding a characteristic data group periodically inserted into a stream of successively transmitted data. Memory (7) stores temporarily a series of receive data corresponding to the minimal subset necessarily including the group looked for. Comparator (8) searches for a reference element relative to the group looked for in the preselected area including one of the modules into which the stored subset is divided. The search is continued module by module until a data group is identified identical to the reference element. Memory (11) memorizes the position of any group identical to the reference element in the module in which any such group was identified. A confirmation search eliminates group positions which are not found again subsequently, until there remains only the position of the last group present, which is deemed to be the reference looked for.

4 Claims, 2 Drawing Sheets

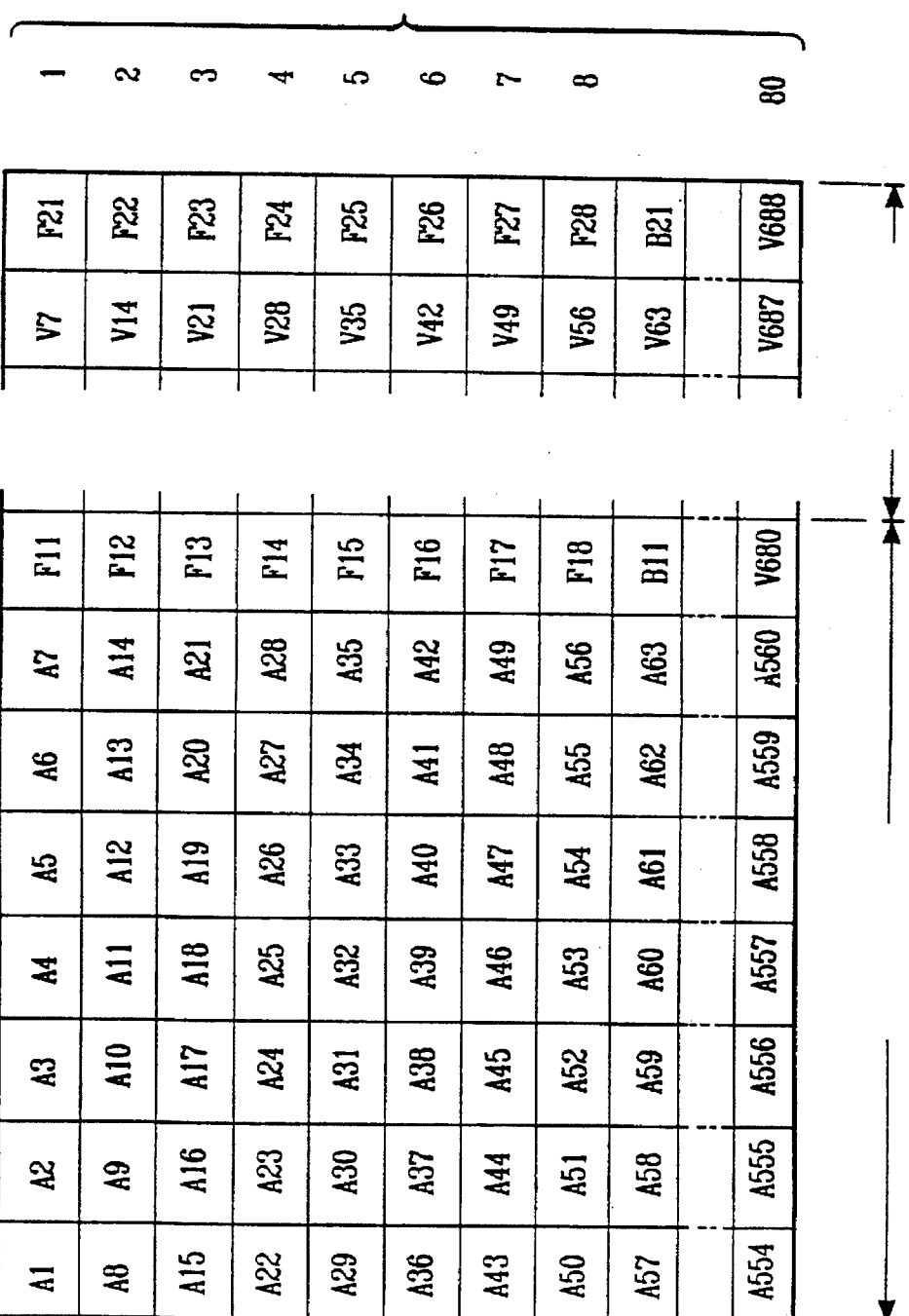

METHOD AND DEVICE FOR FINDING A CHARACTERISTIC DATA GROUP PERIODICALLY INSERTED INTO A DATA STREAM

BACKGROUND OF THE INVENTION

The invention concerns a method and a device for finding a characteristic data group periodically inserted between other data in a digital data stream.

In the field of digital communications a known method of identifying essential elements relating to calls uses characteristic groups of digital data each conformed in a different and specifically identifiable manner. The data constituting such groups has fixed binary values and predetermined relative positions. For example, one known method uses a specific identifier group, usually called a frame alignment pattern, which is transmitted periodically to synchronize the receive part of a digital information transmission system to the send part. This technique is used when the digital data to be transmitted over a link is time-division multiplexed by the send part so that it is essential to be able to identify, at the receiving end, the various time-division channels used for transmitting the data in order to be in a position to demultiplex the data divided between successive frames and which arrives in the various time-division channels.

Various software or hardware devices have therefore been used to scan a received digital bit stream systematically, bit by bit, in order to identify a characteristic data group within it which forms a simple structured pattern, for example a small number of bits with respective fixed values one after the other.

When a simple pattern like this is introduced into a transmitted data stream, subject to given periodicity conditions, the device for finding it can be locked onto the first pattern discovered in order to attempt to find the next identical pattern, allowing for the recurrence rules chosen for this type of pattern. It remains locked on until the device in question finds an identical pattern, again allowing for the previously mentioned recurrence rules.

On the other hand, in the event of erroneous locking onto an unexpected imitation of the pattern, the search device is stumped and will be obliged sooner or later to resume the search from the beginning. This can lead to unacceptable delays when the terminals transmit large volumes of data using a lot of the transmission capacity of the transmission medium employed.

In this case the data constituting the characteristic data group is likely to be widely spaced, although the relative spacings are entirely determined.

Under these conditions the drawbacks of bit by bit searching can become unacceptable. This could arise, for example, with videophone terminals connected to an integrated services digital network (ISDN). Using its search device, when a videophone call is set up, each videophone terminal has to find a first frame alignment pattern in the data stream it receives over the digital link. Otherwise it cannot begin to communicate in the sense that it cannot display any image on its screen and only audio communication is possible.

SUMMARY OF THE INVENTION

The invention therefore proposes a method and a device for fast, reliable identification of a characteristic digital data group inserted periodically into a data stream transmitted at a specific clock rate.

In accordance with one feature of the invention the method comprising the following steps:

temporary modular storage of a volume of data successively received corresponding to the minimal subset necessarily containing at least one characteristic part of the group looked for;

initial searching, by comparison, for a reference element corresponding at least to said characteristic group part in one selected module of the stored subset and continued searching, module by module in the subset, until identification of at least one data group identical to the reference element in one of the modules of said stored subset;

memorizing of the position of any data group found identical to the reference element in the first module in which any such group has been identified in the subset;

confirmation searching, by comparison, for all memorized group positions of a module in the module of the next stored subset having the same numerical position;

maintained memorizing for all memorized group positions found identically in the module of the next subset having the same numerical position;

choosing, as the actual reference position for the group, of the position of the group identical to the reference element which alone remains memorized in a module following an initial search for one subset and at least one confirmation search effected for the next subset.

In accordance with one feature of the invention the search device for implementing the above method includes:

subset memorizing means for temporarily storing modules of a volume of data successively received corresponding to the minimal volume necessarily containing at least one reference element of a group, comparator means for detecting any data group identical to the reference element, means for determining the position of any group found identical to the reference element in a subset module, memorizing means for recording the position of any group found identical to the reference element in a module, said position memorizing means cooperating with the previously mentioned means to verify the persistent presence of a group identical to the reference element in the same position in at least the stored subset following a first subset temporarily stored, and for memorizing, as the actual reference position, the position of the group identical to the reference element which is the only one remaining in memory for a module following an initial search of one subset and at least one confirmation search of the next subset.

BRIEF DESCRIPTION OF THE DRAWINGS

The invention, its features and its advantages are explained in the following description with reference to the figures briefly described below.

FIG. 3 gives one example of the distribution of data in a frame of period "T" made up of a plurality of subframes.

DETAILED DESCRIPTION OF THE INVENTION

Figure 1:
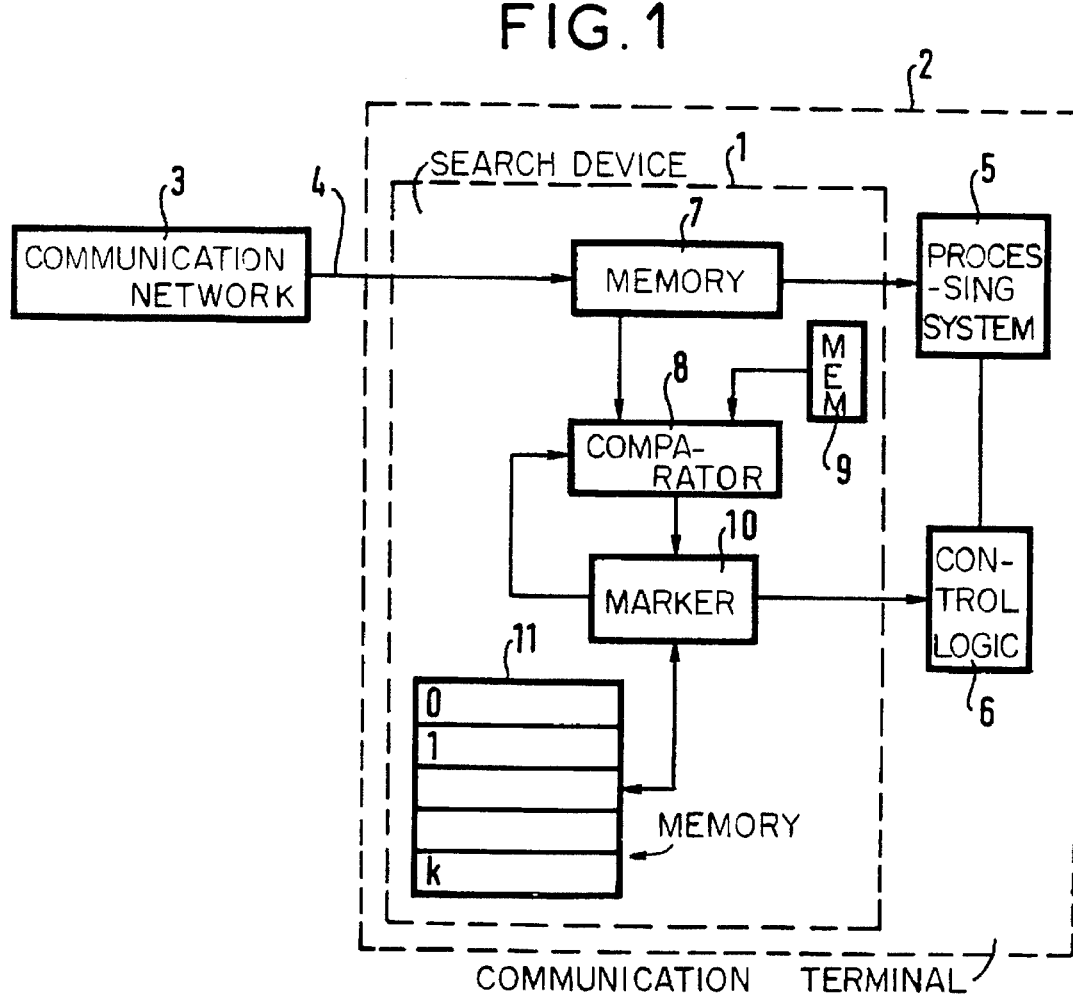
FIG. 1 is a block diagram of a typical application of a pattern search device.

The search device 1 shown in FIG. 1 is part of a communication terminal 2 connected to a communication network 3 by a two-way digital link 4. The terminal 2 includes a man-machine interface (not shown), a system 5 for processing information that it receives and sends and control logic 6, as is usual in this field, and constitutes a subscriber videophone terminal, for example.

The network is an integrated services digital network, for example, to which the communication terminal 2 is connected by a standardized S interface, for example. The terminal 2 then uses at least two standardized voice-data B channels and a standardized data D channel to communicate in each of the two transmission directions via the link 4.

The search device 1 has to detect the presence of a characteristic digital data group among other data in a data stream into which the characteristic group is periodically inserted. To this end the search device has means 7 for temporarily storing part of a data stream.

In the application example mentioned above the characteristic group is a frame alignment pattern, as mentioned above, in this instance a frame alignment word FAW.

If a frame structure such as the H.221 structure standardized by the CCITT is used for communications between the terminal 2 and the network 3, the FAW is made up of a group of eight bits with the respective values 00110111 distributed in a characteristic way in a service subchannel by means of which data is transmitted by the link 4 to the terminal 2. A major characteristic first part of the pattern FAW is made up of seven bits transmitted during a frame "T", the eighth bit being transmitted in the next frame "T". As shown in FIG. 3, each H.221 type "T" frame, which has a period of 10 ms, is divided into 24 subframes with a period "t" of 125 μs. The service subchannel carrying the pattern bits comprises bit periods at the same numerical position in successive frames, FIG. 3 showing various subchannels and in particular eight subchannels SC1 through SC8.

In this example the first seven bits of the major characteristic part are disposed at the same numerical position "r" in seven successive subframes at the start of a first frame "T". The eighth bit of the same pattern has the same numerical position "r" in the subframe which contains it as the seven other bits of this pattern in their respective subframes, but is in a subframe of numerical position "R" of the next frame "T".

If the same pattern is transmitted in more than one of the channels used to transmit data it is naturally possible to search channel by channel and consequently to divide the data into subsets each corresponding to a different channel.

In the case of an ISDN videophone terminal 2 having two standardized B channels and one standardized D channel, the pattern FAW is transmitted to the terminal 2 over the link 4 on each of the B channels and it is therefore sufficient to consider two subsets obtained from data transmitted during a time interval "T" corresponding to two successive frames "T". Each of these two subsets is obtained by selecting the received data from the same channel in the same interval "T" on the basis of their respective positions.

In this example, the received data from the same channel and included in the same subset includes data forming groups with a group period equal to that of the subframes. These groups are assembled from the first data bit received for the interval "T" concerned and for a first channel B1 and from the ninth data bit received for the same interval "T" and for a second channel B2 (FIG. 3).

In the above example, and more generally, it is possible to define a subset corresponding to the minimal volume of data necessarily containing a periodically distributed characteristic group to be looked for.

If, as in the above example, a characteristic group as defined above is positioned in a characteristic manner in a subset including it, it is logical to look for it at the position it should normally occupy. It is therefore possible to define a "preferred" first area in which a first search stage will be started in the subset within which a characteristic group must be found.

In the above example there is therefore a preferred first area for searching for the pattern FAW which corresponds to one of the modules into which the subset is divided, this module including all of the data arriving on a service subchannel included in one of the channels B1, B2 of the terminal 2 during a time interval "T" taken as a reference.

As mentioned above, in this example, the service subchannel must be that defined by the bits at numerical position 8 in successive frames, i.e. subchannel SC8 in FIG. 3.

The first search area for a time interval "T" includes 160 binary data bits successively selected with a period equal to that of the subframes, starting from the eighth data bit received for the interval "T" in question.

The search device 1 includes software or hardware comparator means 8 enabling it to identify within a search area, in this instance within a subset module, the reference element which corresponds to the characteristic group to be found, this group being stored in memory means 9. The identification method is known in itself. In the above example, for convenience and given the time structure of the pattern FAW split between two frames, it is a characteristic part of the group, namely the first seven of the eight bits 00110111, which is used as the reference element initially adopted for the search.

The search device 1 also includes position marker means 10 associated with memory means 11 for respectively determining the position of the data groups which are identical to the reference element in a search area and temporarily retaining the coordinates defining the positions of these groups in this area.

Because a search area corresponds to a series of receive data bits whose positions are defined in a given time interval "T" relative to the start of the interval, it is possible to memorize (in a known manner) the positions of the groups recognized as identical to the reference element looked for, by means of the positions in time of the data bits constituting each of them, or by equivalent means.

Figure 2:
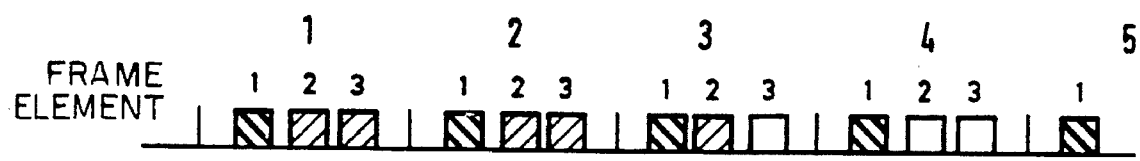
FIG. 2 is a diagram showing the successive stages of finding a characteristic data group in a data stream.

For example, three groups identical to the reference element have been identified for the "T" frame 1 in FIG. 2.

Referring to FIG. 1, the memory means 11 comprise a memory adapted to store k elements each holding the coordinates defining the position of a group recognized as identical to the chosen reference element.

If no group identical to the reference element looked for is found in the first search area examined during a first search stage relating to data received in a first interval "T", a second search stage of the same nature as the first stage is initiated by the position marker means 10 in a second search area comprising another module of the subset including the module corresponding to the first area.

In this example, the second search area is a module of the subset previously considered which corresponds to the subchannel SC7 adjacent the subchannel SC8 previously considered and initially deemed to be a service subchannel. The module corresponding to this sub-subset which constitutes the subchannel SC7 contains the 160 binary data bits successively selected with a period equal to that of the frames starting from the seventh bit received during the first interval "T" previously considered. If the position marker means 10 do not identify any group identical to the reference element looked for in an examined search area, a new search stage of the same nature as the preceding stages is started in a new search area comprising another new module from the subset containing the previous search areas that have been examined with no positive result.

The absence of a positive result for searches covering all the modules of the same subset constitutes a situation requiring specific processing by the control logic of the terminal 2 including the search device 1. This ancillary processing, initiated by the position marker means 10, is not described in detail here.

As soon as at least one group identical to the reference element looked for has been identified and had its position logged during a search stage in the sequence of data of a module taken as the search area for the data of a first interval "T", the position marker means 10 of the search device verifies the results obtained by carrying out a confirmation search under analogous conditions in a second interval "T" following on immediately from the first interval "T".

This confirmation search is carried out during a "T" frame 2 (FIG. 2) for a search area which, for the data processed during the second interval "T", corresponds to that successfully processed for the preceding interval "T".

In the present example, if the search area explored successfully during the first interval I corresponds to a module comprising data of numerical position "ri" of a first of the subsets comprising the data received during a first interval "T", the search area explored during the subsequent confirmation search stage is the module comprising data of numerical position "ri" of the first of the subsets comprising the data received during the following interval "T".

During a confirmation stage the search device 1 determines if there is any group identical to the reference element at a position in the current search area corresponding to that occupied by an identical group in the search area previously examined successfully.

In this example, during a confirmation search stage only the positions of the groups that the search device 1 finds again on progressing from one search stage to the next are taken into account, with the result that there soon remains only the real position of the characteristic group intentionally transmitted with the required period. This is symbolically represented by the disappearance from positions 2 and 3 of frames 3 and 4, there remaining only the characteristic group at position 1 in the various frames 1 to 5 shown in the figure.

If the group looked for is a frame alignment pattern FAW of which one bit is transmitted on its own during a frame "T" after that in which are transmitted the seven other bits which constitute the reference element looked for, provision is made for verifying the presence at the correct position of the bit transmitted on its own by means of a complementary search conducted during the time interval "T" following that in which the position of the group corresponding to the reference element comprising the other seven bits was determined by virtue of the fact that it alone remains in the area (i.e. the module) in which it was looked for, after an initial search and at least one confirmation search. The position memorized for this group is then adopted as the actual reference position and in the case of the search device shown in FIG. 1 it is reported as such to the control logic 6 of the terminal incorporating the device.

We claim:

1. Method of searching for a digital data group inserted periodically into a data stream transmitted at a given clock rate, said method being characterized in that it includes the following steps:

temporary modular storage of a volume of data successively received corresponding to a minimal subset necessarily containing at least one characteristic part of the group looked for;

initial searching, by comparison, for a reference element corresponding at least to said characteristic group part in one selected module of the stored subset and continued searching, module by module in the subset, until identification of at least one data group identical to the reference element in one of the modules of said stored subset;

memorizing the position of any data group found identical to the reference element in the first module in which any such group has been identified in the stored subset;

confirmation searching, by comparison, for all memorized group positions of a module in the module of the next stored subset having the same numerical position;

maintained memorizing for all memorized group positions found identically in the module of the next subset having the same numerical position;

memorizing, as the actual reference position, of the position of the group identical to the reference element which alone remains memorized in a module following an initial search for one subset and at least one confirmation search effected for the next subset.

2. Search method according to claim 1 for a data stream comprising data transmitted successively in subframes of period "t", by at least one transmission channel into which the group is inserted with a period "T" which is a multiple of "t" in a same one of the subchannels constituting a transmission channel, characterized in that it includes temporary storage of a volume of data successively received for a transmission channel during the same period of duration "T" and search steps each applying to data received with the same numerical position during successive subframes of period "t" during the period "T" considered.

3. Search method according to claim 2 for a group comprising data with the same numerical position in successive subframes of period "t" divided over at least two periods "T" of which the first contains the data from a characteristic part of the group, characterized in that it includes a complementary search step, after confirmation that only one position remains memorized in a module of a subset, to verify the presence at the expected position in the frame "T" following that in which said single remaining position was determined of the part of the corresponding group not so far identified, before the step of signalling the position of the group as the actual reference position.

4. Search device for implementing the method according to claim 1 characterized in that it includes subset memorizing means (7) for temporarily storing modules of a volume of data successively received corresponding to a minimal volume necessarily containing at least one reference element of a group, comparator means (8) for detecting any data group identical to the reference element, means (10) for determining the position of any group found identical to the reference element in a subset module, memorizing means (11) for recording the position of any group found identical to the reference element in a module, said position memorizing means cooperating with the means for determining the position to verify the persistent presence of a group identical to the reference element in the same position in at least the stored subset following a first subset temporarily stored, and for memorizing, as the actual reference position, the position of the group identical to the reference element which is the only one remaining in memory for a module following an initial search of one subset and at least one confirmation search of the next subset.

* * * * *